March 11, 1952     D. P. ECKMAN     2,588,622
PNEUMATIC CONTROL APPARATUS
Filed Nov. 15, 1947     2 SHEETS—SHEET 1

*INVENTOR.*
DONALD P. ECKMAN
BY
*Arthur H. Swanson*
ATTORNEY

March 11, 1952 D. P. ECKMAN 2,588,622
PNEUMATIC CONTROL APPARATUS
Filed Nov. 15, 1947 2 SHEETS—SHEET 2
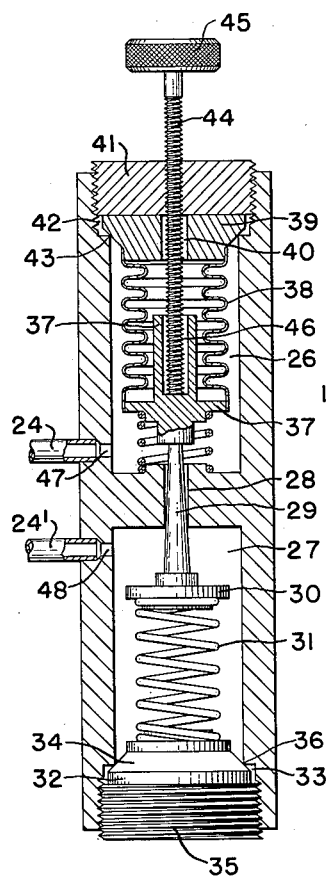
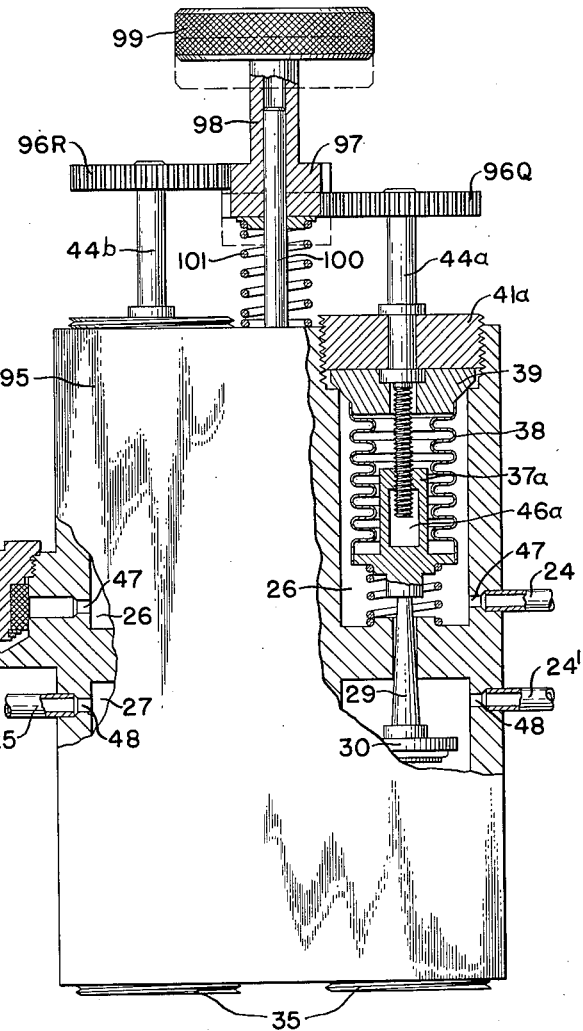
*INVENTOR.*
DONALD P. ECKMAN
BY Arthur H. Swanson
ATTORNEY Patented Mar. 11, 1952

2,588,622

UNITED STATES PATENT OFFICE 2,588,622

PNEUMATIC CONTROL APPARATUS

Donald P. Eckman, Ithaca, N. Y., assignor, by mesne assignments, to Minneapolis-Honeywell Regulator Company, Minneapolis, Minn., a corporation of Delaware Application November 15, 1947, Serial No. 786,247

11 Claims. (Cl. 137—153)

The general object of the present invention is to provide improved air controllers adapted to give proportional, reset and rate responses on a change in a controlling condition. The invention is characterized by the simplicity, compactness and low inherent cost of construction of the improved controllers, and by the desirable operating characteristics of those controllers.

A more specific object of the invention is to provide an air controller with simple and effective pneumatic means for obtaining proportional and reset control responses. Heretofore, it has been the regular practice of the art to employ hydraulic means for obtaining reset control responses in air controllers giving such reset as well as proportional responses. I have discovered that it is practically feasible to obtain reset responses by the novel pneumatic means disclosed herein. The use of such pneumatic means avoids practical difficulties such as liquid leakage and inaccuracies due to the expansion and contraction of the liquid when the temperature changes, inherent in the uses heretofore made of hydraulic means to obtain reset. The invention in its broader aspects is adapted for use in air controllers giving only proportional and reset control responses, and in air controllers giving those responses and also giving rate responses.

The invention is characterized by the effective use made of flow restricting means for regulating very small rates of air flow to thereby regulate the control responses of an air controller, and a specific object of the invention is to provide improved valve means for regulating very small rates of flow through flow passages to thereby regulate the reset rate and rate time of the controller.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 2 is a sectional elevation of one of the flow restricting devices shown diagrammatically in Fig. 1; and Fig. 3 is a sectional elevation of a compound valve structure including two flow restricting valves adapted for use in lieu of the two flow restricting devices shown diagrammatically in Fig. 1.

Figure 1:
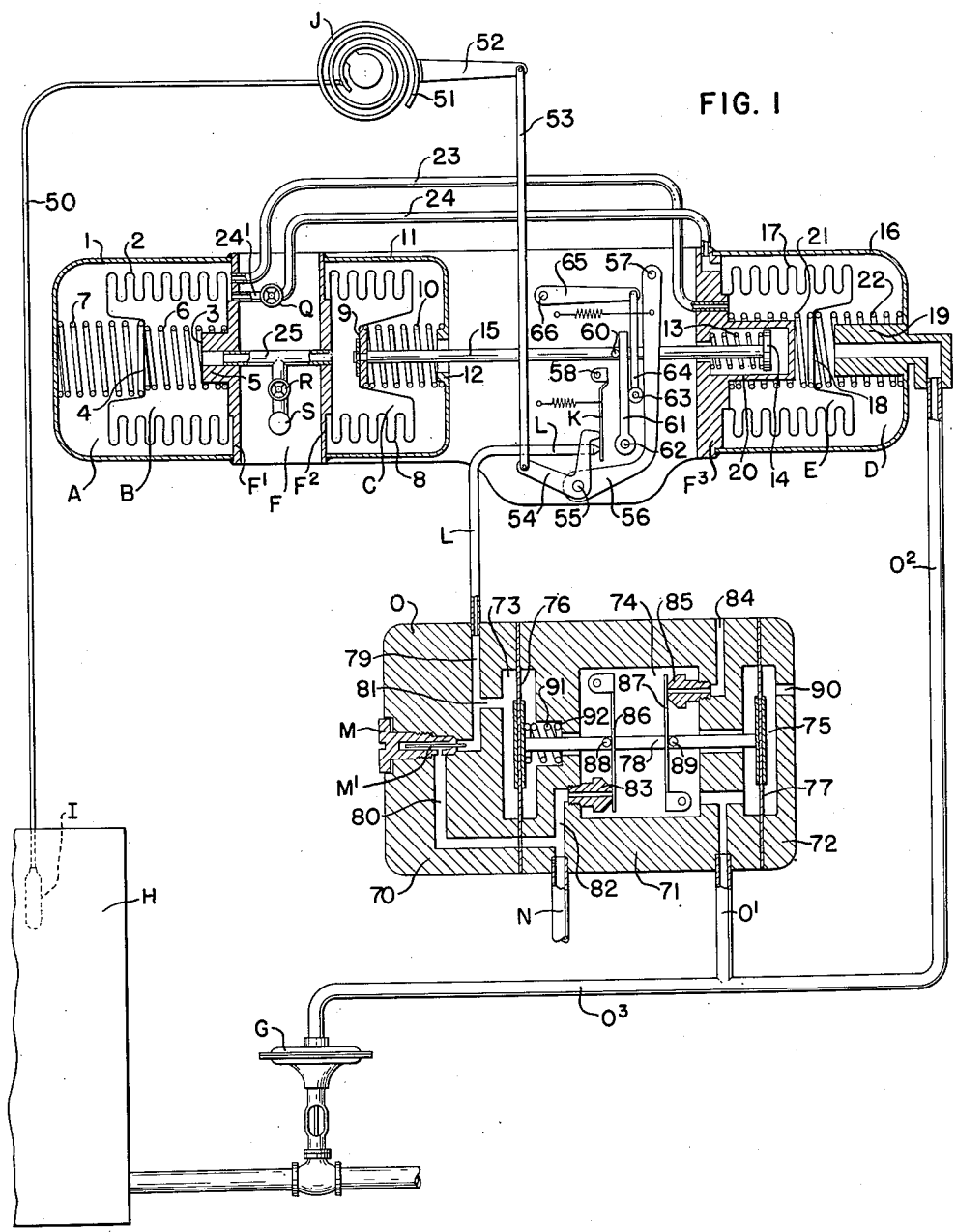
Fig. 1 is a sectional elevation of an air controller with associated control apparatus shown diagrmmatically.

The air controller shown by way of example in Fig. 1 is adapted to give proportional, reset and rate control responses, and comprises axially aligned expansible air pressure chambers A, B, C, D and E mounted on a supporting framework. The latter, as somewhat diagrammatically shown in Fig. 1, comprises a base F and spaced apart bracket or pier portions $F^1$, $F^2$ and $F^3$. The form and structural details of the framework and expansible chambers are not essential features of the present invention.

In the arrangement shown in Fig. 1, the outer wall of the chamber A is a rigid casing 1 of cylindrical form connected at one end to the pier or bracket $F^1$. The wall of the chamber B, which is located within the casing 1, comprises a corrugated tubular body 2 formed of flexible metal. One end of the bellows body 2 is adjacent the pier or bracket $F^1$ and is secured to the latter. As shown, the end of the chamber B adjacent the bracket $F^1$ is closed by a stationary recessed or dished end wall 3, having its peripheral portion attached to the end of the bellows body 2. The other end of the chamber B is closed by a dished end wall 4 having its peripheral portion connected to the corresponding end of the bellows body. The recess in the end wall 3 of the chamber B receives a cylindrical positioning part 5 attached to the corresponding side of the bracket $F^1$.

As will be apparent, the bellows body 2 and end wall 4 separate the chambers A and B, and form a common movable wall for each of those chambers. The wall 4 is biased to a normal position by spring bias forces. The latter may be due in part to the natural resiliency of the bellows body 2, but in large part, at least, are due to the action of helical compression springs 6 and 7 which, as shown, are coaxial with the bellows body 2. The spring 6 is within the chamber B and acts between the walls 3 and 4. The spring 7 is external to the chamber B, but is in the chamber A and acts between the movable wall 4 and the adjacent rigid end wall of the chamber A.

The wall of the chamber C comprises a corrugated tubular metallic bellows body 8 which is attached at one end to the pier or bracket $F^2$ and is provided at its other end with a movable end wall 9. The latter is shown as a cup-shaped body extending into the space surrounded by the bellows body 8 and having a rim portion attached to the end of the bellows body remote from the bracket F². The end wall 9 is biased to a normal position by means comprising helical compression springs 10 and 13. The spring 10 extends into the cup-shaped end wall 9 and acts between the latter and the inturned flange 12 of a rigid casing element 11 which surrounds the bellows body 8 and is shown as attached to and supported by the bracket F². The springs 10 and 13 act in opposite directions on the end wall 9. The spring 13 acts directly between the bracket F³ and a spring base 14 at the right of the bracket F³ and connected to the end of a follow-up rod 15 which extends through an axial opening in the bracket F³ and has its left end rigidly connected to the end wall 9. As is explained hereinafter, the rod 15 forms a means for giving negative and positive follow-up or feed-back adjustments to the flapper valve controlling the pressures in the chambers A, B, C, D and E.

The chamber D is surrounded by a rigid cup-shaped casing element 16 located at the opposite side of the bracket F³ from the chambers A, B and C, and having its rim portion attached to the bracket F³. The chamber E is located within the chamber D and is surrounded by a tubular corrugated metallic body 17 having one end adjacent the pier F³ and secured in fixed relation thereto. The other and movable end of the bellows body 17 is connected to the rim portion of a cup-shaped end wall part 18 which extends into the space surrounded by the body 17. The bellows body 17 and end wall 18 form a movable partition wall separating the chambers D and E.

For reasons hereinafter explained, the extent of axial movement of the end wall 18, and thereby the extent of volume expansion and contraction of each of the chambers D and E, is definitely limited. As shown in Fig. 1, the movement of the end wall 18 is directly limited by stationary stops 19 and 20. The stop 19 is shown as a cylindrical block within the chamber D and having one end attached to the end of the casing 16 remote from the bracket F³. The other end of the stop 19 extends into the cup-shaped end wall 18 and is engaged by the central or bottom portion of that wall when the chamber E attains its predetermined maximum expansion. The stop 20 is a rigid cup-shaped part having its rim portion secured to the bracket F³ and having its central or bottom portion suitably displaced to the right from the bracket F³ and in position to be engaged by the central portion of the movable end wall 18 when the volume of the member E is reduced to its predetermined minimum. The cup-shaped stop member 20 forms a portion of a housing wall from the previously mentioned spring base 14 secured to the right end of the follow-up rod 15. The movable wall 18 is biased to an intermediate position by the opposing actions of helical compression springs 21 and 22. The spring 21 is in the chamber E and acts between the bracket F³ at the rim portion of the rigid member 20 and the inner side of the central portion of the end wall 18. The spring 22 is in the chamber D and acts between the central portion of the end wall member 18 and the end of the rigid casing 16.

The chamber E is in free communication with the chamber A through a conduit 23. The chamber D is in restricted communication with the chamber A through a conduit 24, a flow restricting device Q and a conduit section 24'. The chambers B and C are in free communication with one another through a pipe 25 and are each in restricted communication with the atmosphere through a flow restricting device R. The thoroughfare through the flow restricting device R is directly connected at one end to the conduit 25, and, as shown, has its other end connected to the atmosphere through an air filter S. Each of the flow restricting devices Q and R may be a separate needle valve, which is advantageously of the form shown in Fig. 2. In a preferred form of the invention hereinafter described, both needle valves are so combined in a single compound valve structure that both valves may be simultaneously adjusted.

The needle valve Q in the form shown in Fig. 2 comprises a hollow body formed with axially aligned chambers 26 and 27 in communication with one another through a restricted axial passage 28 extending through a portion of the valve body which forms a common bottom wall for each of the chambers 26 and 27. The flow capacity of the axial passage 28 is regulated by longitudinal adjustment of a tapered needle valve part 29 which extends through the passage 28 and is connected at its lower end to a spring abutment head member 30 axially movable in the chamber 27. The valve 29 is biased for movement in the upward direction as seen in Fig. 2 by a helical spring 31 acting between the movable abutment part 30 and the normally stationary closure part 32 for the lower end of the chamber 27. The part 32 comprises a lower end portion larger in diameter than the chamber 27 and received in a counter-bore 33 formed in the valve body below, and larger in diameter than, the chamber 27. The member 32 also comprises an upper end portion smaller in diameter than the chamber 27 and within the latter, and an intermediate conical portion 34 between the two end portions of the member 32. An externally threaded plug 35 is in threaded engagement with the internally threaded lower end portion of the counterbore 33. When the plug 35 is screwed home, the conical surface 34 of the member 32 is forced into joint sealing engagement with the corners 36 at which the wall surrounding the chamber 27 intersects the circularly extending shoulder at the inner edge of the upper end of the counterbore 33.

The upward movement of the valve 29 under the action of the bias spring 31, is regulated by the engagement of the upper end of the valve 29 with a crosshead or stop member 37 which is axially adjustable in the chamber 26. The member 37 comprises a peripheral flange portion which enters and is soldered or brazed to the lower end of a tubular bellows body 38. The latter has its upper end entered by and soldered or brazed to the lower end portion of an upper closure member 39. The latter is shown as similar in form to the closure member 32 except that it is formed with a central passage 40. The closure member 39 is normally secured in place by an externally threaded plug 41 in threaded engagement with the internally threaded upper end portion of a counter-bore 42. The plug 41 and the counter-bore 42 may be exactly like the plug 35 and counter-bore 33, respectively, except that the plug 41 is formed with a threaded axial passage. When the plug 41 is screwed home it forces the closure member 39 downward and thus brings its conical surface into engagement with the circular corner 43 at the inner edge of the lower end wall of the counter-bore 42 into which the plug 41 is screwed.

The internally threaded axial passage in the plug 41 receives an adjusting screw or threaded valve spindle 44 which extends through said threaded passage and through the aligned passage 40 into engagement with the adjustable valve stop member 37. As shown, the latter is formed at its upper side with an elongated well or socket 46 into which the lower end of the threaded valve spindle 44 extends. The valve spindle is provided at its upper end with a knurled head or knob 45 by means of which the spindle 44 may be rotated to force the needle valve member 29 downward against the action of the spring 31, or rotated in the opposite direction to permit the valve member 29 to move upward under the action of the spring 31 and thus variably restrict the flow capacity of the annular space between the tapered valve 29 and the surrounding cylindrical wall of the passage 28.

As shown in Fig. 2, the valve chamber 26 is connected to the previously mentioned conduit 24 through a wall port 47, and the chamber 27 is connected to the previously mentioned conduit section 24', and thereby to the pressure chamber A, through a wall port 48. The ports 47 and 48 are shown in Fig. 2 at the same side of the valve body, but they may be angularly displaced relative to one another about the axis of the valve body as conditions may make desirable. The valve R, diagrammatically shown in Fig. 1, may be identical in construction with the valve Q, shown in Fig. 2, although the maximum cross-sectional area of the annular flow passage between the tapered or conical needle valve member 29 and the cylindrical wall of the passage 28 through which the needle valve extends, may be approximately twice as great in the valve Q as in the valve R.

The valve structure shown in Fig. 2 is well adapted for its intended use of precisely varying the cross-sectional area of a very small flow passage. While the valve dimensions may be varied somewhat, as conditions make desirable, it is noted by way of illustration and example, that in one embodiment of the invention, the valve passage 28 is one-quarter of an inch long and one-sixteenth of an inch in diameter. In that embodiment, the diameter of the portion of the needle valve 29 entering the passage 28 differs so little from the diameter of said passage that with the valve structure adjusted for use as the device R of Fig. 1, the maximum effective cross-sectional area of the annular passage between the valve member 29 and surrounding wall of the passage 28 is slightly less than 0.00006 square inches. With the described construction, leakage through the points between the valve body and the closure parts 32 and 39 is effectually prevented, and the bellows 38 prevents leakage through the central passages in the parts 39 and 41.

As diagrammatically shown by way of example in Fig. 1, the air controller is used to adjust a regulator valve G supplying fuel to a heater H as required to maintain the heater temperature at an approximately constant predetermined value. The heater temperature is measured by a fluid pressure thermometer having its bulb I within the heater. The bulb pressure, which is a measure of the bulb temperature, is transmitted through a pipe 50 to the fixed end of a Bourdon tube J. The latter is of spiral form and has its free end 51 rigidly connected to one end of an arm 52. The other end of the arm 52 is connected by a connecting rod or link 53 to one arm of a bell crank lever 54. The latter is pivoted at 55 to a movable support 56 which is suspended from a stationary pivot 57. As is hereinafter explained, the member 56 is given a turning movement about the pivot 57 as the chamber C expands and contracts. A clockwise turning movement of the bell crank lever 54 causes the uprising arm of the latter to engage a flapper valve K, turning the latter counterclockwise away from the discharge orifice at the adjacent end of a bleed nozzle L. The valve K is shown as suspended from a supporting pivot 58 and is spring biased for clockwise movement into engagement with the nozzle. The latter is connected through a flow restriction device M to a pipe N supplying air under a constant pressure which ordinarily is of the order of seventeen pounds per square inch.

Counter-clockwise and clockwise movements of the valve K toward and away from the nozzle L thus decrease and increase the pressure in the nozzle L by increasing and decreasing the discharge of air through the nozzle and thus increasing and decreasing the pressure drop in device M. The valve K is caused to approach the nozzle L, or is moved away from said nozzle by clockwise and counter-clockwise movements of the supporting member 56 about its support 57, as well as by counter-clockwise and clockwise adjustments of the bell crank 54 about its pivot 55. Increases and decreases in the pressure in the nozzle L operate through a pilot valve or pneumatic relay O respecitvely to increase and decrease the pilot valve output pressure. The output pressure is transmitted through the conduit $O^1$ and pipe $O^2$ to the air controller chamber D, and is transmitted through the conduit $O^1$ and pipe $O^3$ to the pressure chamber of the regulator G. The latter is biased to its closed position and is adjusted in response to an increase or decrease in the pilot valve output pressure, to increase or decrease the rate at which fuel is supplied to the heater H.

The means through which the expansion and contraction of the controller chamber C gives counter-clockwise and clockwise adjustments, respectively, to the member 56 and thereby respectively decreases and increases the pressure in the nozzle L, comprises an adjustable thrust transmitting action between the rod 15 and the member 56. That thrust transmitting action comprises a lateral projection 60 from the rod 15 which may be adjustable, a vertically disposed lever 61 pivoted at its lower end on a pivot pin 62 adjacent the lower portion of the member 56, and a thrust pin 63 interposed between the right edge of the lever 61 and the left edge of the depending portion of the member 56 which is displaced to the right from the lever 61 as shown in Fig. 1. The vertical displacement of the pin 63 from the level of the pivot 62 for the lever 61, fixes the leverage with which the movable wall of the chamber C acts on the member 56. The thrust pin 63 is vertically adjustable longitudinally of the lever 61. As diagrammatically shown, the pin 63 is suspended by a link 64 from an arm 65 pivoted at 66 and clamped or frictionally held in any angular position in which it is adjusted. The leverage with which the movable rod 15 acts on the member 56 thus depends on the angular adjustment of the arm 65. The generally horizontal movement given to the pivot pin 55 and thereby to the bell crank lever 54 by a given longitudinal adjustment of the rod 15, is thus increased or decreased, respectively, by the adjustment of the pin 63 upward toward, or downward away from the rod 15. As those skilled in the art will recognize, the means shown diagrammatically in Fig. 1, through which a longitudinal movement of the rod 15 effects a regulable adjustment of the supporting pivot for the lever 54, are of the well known type shown in the Moore Patent 2,125,081, of July 26, 1938.

The pilot valve O shown in Fig. 1 is of the special type disclosed and claimed in my prior application, Serial No. 651,273, filed March 1, 1946, and is characterized by the fact that in its balanced condition, the pilot valve output pressure is independent of, and in no predetermined ratio to the pilot valve input pressure transmitted to the pilot valve from the nozzle L. In the balanced condition of the apparatus, the pressure in the nozzle L is at a fixed value predetermined by the spring characteristic of a bias spring hereinafter described. Because the ratio of the pilot valve output pressure to the nozzle pressure may vary without limit, this type of pilot valve is sometimes referred to as an infinite ratio pilot valve.

As shown in Fig. 1, the body of the pilot valve O is formed of sections 70, 71 and 72 which are recessed to form chambers 73, 74 and 75. The chamber 73 is between the recessed side of the section 70 and a diaphragm 76 clamped between adjacent sides of the sections 70 and 71. The chamber 75 is located between the recessed side of the section 72 and a diaphragm 77 which is clamped between the adjacent sides of the sections 71 and 72. The chamber 74 comprises a main portion centrally located in the section 71 and axial extensions at each side of the body portion which are enlarged at the sides of the section 71 to form chamber portions respectively adjacent the diaphragms 76 and 77 and which are similar in general shape and in their radial dimensions to the chambers 73 and 75. A rod 78 extends through the chamber 74 and has its ends connected to the diaphragms 76 and 77. The nozzle L is connected to the air supply pipe N through pilot valve body channels 79 and 80 and the flow restricting device M. The latter is mounted in the pilot valve body section 70 in which all of the channel 79 and most of the channel 80 are formed. The flow restricting device M includes a small bore pipe section M¹ and is shown as of the well known type disclosed in the above mentioned Moore patent and need not be further described herein. The channel 79 is connected to the pressure chamber 73 by a channel 81.

The air supply pipe N is connected to the chamber 74 by a channel 82 formed in the pilot valve body section 71. The channel 82 opens into the chamber 74 through an inlet nozzle 83. The chamber 74 communicates with the atmosphere through a vent channel 84 and vent nozzle 85 at the inner end of that channel. In the balanced condition of the pilot valve, the nozzles 83 and 85 are closed by associated flapper inlet and vent valves 86 and 87, respectively. The valves 86 and 87 are located in the central portion of the chamber 74, and each extends transversely to the rod 78 from one side to the other of the latter. The end of each flapper valve remote from the corresponding nozzle is pivoted to the pilot valve body, and each flapper valve is biased to the closed position which it occupies in the balanced condition of the pilot valve. The rod 78 is provided with lateral projections 88 and 89 so arranged that on any movement of the rod 78 to the right from its balanced position, the projection 88 engages the flapper inlet valve 86 and moves the latter away from the inlet nozzle 83 and thus increases the pressure in the chamber 74; and on any movement of the rod 78 to the left from its balanced condition, the projection 89 engages the flapper vent valve 87 and moves it away from the nozzle 85, thus opening the chamber 74 to the atmosphere and thereby reducing the pressure in said chamber.

As shown, the diaphragm 76 and 77 are of the same size and are subjected to equal thrusts in opposite directions by the pilot valve output pressure maintained in the output chamber 74. The outer side of the diaphragm 77 is subjected to the pressure of the atmosphere with which the chamber 75 is in communication through a port 90. The outer side of the diaphragm 76 is subjected to the nozzle air pressure. The diaphragm 76 is also subjected to a constant calibrating force by a helical spring 91 which surrounds the rod 78 and acts between the right side of the diaphragm 76 and an annular shoulder portion 92 of the valve body section 71. The pilot valve O can thus be in its balanced condition in which both flapper valves 86 and 87 occupy their closed positions only when the fluid pressure force acting against the outer side of the diaphragm 76 exceeds the force which the spring 91 exerts against that diaphragm by an amount equal to the force which the atmospheric pressure exerts against the outer side of the diaphragm 77. Since the diaphragms 76 and 77 are of the same size and since the pressure in the nozzle L includes the pressure of the atmosphere, the balanced condition of the pilot valve thus requires that the pressure in the nozzle L must subject the diaphragm 76 to a force equal to the opposing force impressed on the diaphragm by the spring 91.

The apparatus may well be so proportioned and calibrated that with the usual pressure in the supply pipe N of about 17 pounds per square inch above the pressure of the atmosphere, the force of the spring 91 should be such as to hold the pilot valve in its balanced condition when the pressure in the nozzle L is 4½ pounds per square inch above the pressure of the atmosphere.

Fig. 3 illustrates a valve mechanism in which the distinctive structural and operating features of the separate flow restricing valves Q and R previously described, are combined in a single valve unit comprising a common valve body 95. The latter is formed with two side by side pairs of aligned valve chambers 26 and 27. The pairs of valve chambers 26 and 27 may be connected, arranged and provided with end closures and valve adjusting meachanisms identical to those shown in Fig. 2, except in respect to the form of the means for adjusting the valve engaging crosshead or stop member 37 of Fig. 3. The member 37a replaces the member 37 of Fig. 2, and differs from the latter only in that the upper portion of the inner wall of the well 46a in the part 37a is internally threaded for engagement with the valve spindle 44a of Fig. 3. The spindle 44a differs from the spindle 44 of Fig. 2 in that it is swivelled in the plug 41a of Fig. 3, whereas the spindle 44 is in threaded engagement with the plug 41 of Fig. 2. The left hand spindle 44b of Fig. 3 differs from the spindle 44a, only in its length. The right hand spindle 44a of Fig. 3 is provided at its upper end with a spur gear element 96Q for engagement with an elongated driving spur gear 97. The gear 97 is provided with an uprising stem 98 which carries a knob or knurled head 99 at its upper end. An axial passage formed in the gear 97 and its stem portion 98 receives the upper portion of a stationary guide post 100 attached at its lower end to the housing body 95. As shown, a spring 101 acts between the upper end of the valve housing 95 and the lower end of the gear 97 to bias said gear to its position shown in full lines in Fig. 3, in which the lower portions of the elongated gear teeth of the gear 97 are in mesh with the teeth of the gear 96Q, while the upper portions of the teeth of the gear 97 are in mesh with the teeth of the gear 96R carried at the upper end of the left hand valve spindle 44b of Fig. 3.

As shown, the right hand valve mechanism of Fig. 3 has its wall port 47 connected to the pipe section 24 and has its wall port 48 connected to the pipe 24', and is thus adapted to serve the purposes of the flow restricting device Q of Fig. 1. The left hand valve mechanism of Fig. 3 has its outlet port 48 connected to the pipe 25 and thereby to each of the pressure chambers B and C and has its wall port 47 connected to the atmosphere through a chamber portion 102 of the valve body 95 within which an air filter S of conventional type is mounted, and is thus adapted to serve the purposes of the flow restricting device Q of Fig. 1.

The only difference between the Fig. 3 right hand valve mechanism parts, including the gear 96Q, and the left hand valve mechanism parts including the gear 96R, is the respective lengths of the valve spindles 44a and 44b. The valve spindle 44b is made longer than the valve spindle 44a so that the gear 96R carried by the spindle 44b is at a higher level than the gear 96Q attached to the upper end of the spindle 44a. This arrangement of the gears permits the two valve spindles to be simultaneously rotated by the gear 97 when the latter occupies the position shown in full lines in Fig. 3, and permits the separate rotation of the gear 96Q when the gear 97 is depressed into its dotted line position. The gear 97 may be so depressed by applying pressure to the knob 99 to overcome the bias action of the spring 101, thereby lowering the gear 97 into its dotted line position shown in Fig. 3, in which the gear 97 is out of mesh with the gear 96R. With the gears 97 and 96R thus disconnected, the rotation of the knob 99 adjusts only the valve spindle 44a. With the gear 97 in its normal position shown in full lines in Fig. 3, the rotation of the knob 99 simultaneously and similarly adjusts both valve mechanisms. This is desirable since it has been found that ordinarily when an adjustment of either the reset rate or the rate time is desirable, it is advantageous to simultaneously adjust both. However, the relative cross-sectional area of the restricting devices require adjustment from time to time to adapt the controller for use with different control process conditions. Since the spindle 44a may be rotated in either direction independently of the spindle 44b when the gear 97 is depressed to disengage the gear 96R, the construction shown in Fig. 3 permits of a desired relation of the cross-sectional areas of the flow passage of the two valves.

In the normal operation of the apparatus shown in Fig. 1, a deviation from the predetermined normal value of the temperature of the thermometer bulb I, results in an adjustment of the flapper valve K by the Bourdon tube J in the direction to give an opening or closing adjustment to the regulator G accordingly as the deviation is a temperature decrease or a temperature increase. When, for example, the thermometer bulb temperature decreases below its control point value, the pressure transmitted to the Bourdon tube J is reduced and the latter then gives a clockwise adjustment to the arm 52 and a counter-clockwise adjustment to the lever 54. The flapper valve K is thus permitted to move toward the nozzle L, thereby increasing the nozzle pressure. The nozzle pressure increase is transmitted to the pilot valve chamber 73 and operates through the diaphragm 76 and crossrod 78 to give an opening adjustment to the flapper valve 86. Thereupon, air flows into the valve chamber 77 from the pipe N and increases the pilot valve output pressure. The pilot valve output pressure increase is transmitted from the relay chamber 74 to the regulator G and gives the latter an initial adjustment in the direction to increase the supply of fuel to the heater I. The output pressure increase is also transmitted through the pipe O² to the chamber D and increases the pressure therein.

The pressure increase in the chamber D moves the partition wall 18 between the chambers D and E to the left and thus increases the pressure difference in the chamber E. Any pressure between the chambers D and A results in a pressure equalizing flow through the conduit 24 and flow restricting device Q, and is thus adapted to eventually make the pressure in the chamber A equal to the pressure in the chamber D, unless those pressures are equalized more rapidly as a result of the pressure increase in the chamber E. That pressure increase is transmitted immediately to the chamber A through the conduit 23. However, when only a portion of the pressure increase in the chamber D is required to move the partition wall 18 into engagement with the stop formed by the housing part 20, only that portion of the chamber D pressure increase is transmitted to the chamber E through the conduit 23. In such case, the magnitude of the initial follow-up action on the flapper valve is small relative to the initial change in the relay output pressure, and the latter may be high enough to effect and briefly maintain a wide open adjustment of the regulator valve G, although the output pressure transmitted to the regulator when the retarded flow of air into the chamber A from the chamber D has completed the follow-up action may be substantially lower than that required to keep the regulator valve G wide open.

When the initial increase in the pilot valve output pressure is too small to move the wall 18 into engagement with the housing part 20, the absolute magnitude of the initial follow-up action is correspondingly small. In relation to the magnitude of output pressure increase, the initial follow-up action is then substantially greater than when the initial increase is more than sufficient to move the wall 18 against the stop 20.

The rate response is thus of such character that for large sudden deviations of the controlled variable from its control point value, the regulator valve G is fully opened or closed, while for small deviations the output pressure is momentarily amplified by the creation of a much smaller rate amplitude effect than is created by a large sudden deviation. This automatic selection of the rate amplitude in accordance with the amount of deviation is practically desirable.

With a rate valve of the special construction shown in Fig. 1 and in Fig. 3, it is practically feasible to obtain a rate response adjustment of 10–0.1 of a minute for one turn of the needle valve spindle 44 or 44a. With a reset valve of the construction illustrated in Figs. 1 and 3, it is practically feasible to make a reset rate adjustment of 0-2 per minute for one turn of the needle valve spindle 44 or 44b. The valve mechanism shown in Fig. 3 makes it practically feasible to synchronize the reset rate and rate response adjustments as is found desirable in practice.

With the valve arrangement shown in Fig. 3, the rate action may be readily eliminated during periods in which its use is unnecessary or undesirable by depressing the knob 99 and rotating it to give a wide open adjustment to the corresponding valve 29 after first rotating the knob 99 to give an appropriate adjustment to the reset valve spindle 44b. The rate response action of the apparatus shown in Fig. 1 is practically desirable in almost all air controllers, used for temperature control and in practically all air controllers associated with and controlled by potentiomatic measuring and control mechanism. It is not ordinarily used with air controllers used for flow, pressure and level control purposes. Where the air controller is intended for permanent use under conditions in which the rate response is not required, the pressure chambers D and E, the conduit sections 23, 24 and 24', and rate regulation valve Q may be omitted from the instrument shown in Fig. 1, with a corresponding reduction in the controller space requirements and production cost. In such case, the pilot valve output pressure pipe O² may be connected directly to the chamber A as the pipe 23 is connected to that chamber in Fig. 1, or in any other suitable manner. With its rate response features eliminated, the controller of Fig. 1 will have the general operating characteristics and capacity of the well-known and extensively used commercial type of air controller with reset made in accordance with the disclosure of the previously mentioned Moore patent, but will require appreciably less space and will have an inherently lower production cost. The controller shown in Fig. 1 with its rate response features intact is adapted for mounting in a control instrument housing of the type, form and dimensions now employed in housing controllers of the above mentioned commercial type, since the controller shown in Fig. 1 with its rate response features actually requires less space than the said commercial type controller which has no rate response features. It is noted that the valve structure shown in Fig. 3 may be readily proportioned and arranged for mounting in the space between the piers or brackets F¹ and F² of the controller shown in Fig. 1.

In addition to its advantage over prior air controllers in respect to compactness and inherent low cost of construction, the present invention has important practical advantages over most air controllers now in use, as a result of its use of air, with its compressibility, to obtain reset and rate responses, in lieu of the use of incompressible liquid, as has been the usual commercial practice heretofore. The use of the infinite ratio type of pilot valve in connection with apparatus in which the compressibility of air is utilized in obtaining reset and rate responses, is especially desirable because the high sensitivity of such a pilot valve makes it possible to take full advantage of the sharpness of the reset and rate responses obtainable when the fluid used in obtaining such responses is air instead of oil or other liquid. Since the nozzle pressure always has the same value in the balanced condition of the apparatus, and because of the reset sharpness, on the attainment of balance with the improved controller, the value of the controlled variable and the position of the recording pen, usually associated with such a controller, will correspond precisely and not merely approximately, to the control point value of the temperature or other controlled variable.

While the air pressures maintained in the chambers B and C are equal at all times, the separation of these chambers into two separate expansible units has practical operating as well as structural advantages. In particular, they permit the two separate chambers to be so constructed, proportioned and provided with biasing means as to facilitate the proper calibration of each chamber for the intended use of the controllers.

While the separation of the chambers B and C as shown in Fig. 1, requires the rod 15 to be wholly to the right of the first and second chambers and of a portion of the third chamber, the construction also permits the rod to be elongated sufficiently for the convenient disposition of the valve mechanism actuated by the rod 15 through its lateral projection 16 between the ends of the rod, and so as to desirably minimize stresses on the connection to either end of the rod resulting from any slight lateral displacement of the other end of the rod which may occur.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. An air controller comprising a framework and first, second and third expansible chambers each having walls including a rigid wall portion attached to said framework, a movable wall separating said first and second chambers and biased to a predetermined position, said third expansible chamber being in free communication with said second chamber and having a movable wall, means biasing the last mentioned wall to a predetermined position comprising a rod connected at one end to said wall and a cross-head connected to the other end of the rod, a biasing spring acting between said last mentioned movable wall and said framework and a second biasing spring acting between said cross-head and framework and opposing movement of the rod in the direction in which the first mentioned spring tends to move the rod, means providing restricted communication between said second and third chambers and the atmosphere, valve means regulating the air pressure in said first chamber and valve operating means including an element moving in response to variations in a controlled variable to adjust said valve means to increase and decrease the pressure in the first chamber as said variable varies in one direction or the other from a normal value thereof, and valve adjusting means actuated by said rod to effect follow-up and reset adjustments of said valve means when said rod is moved away from and returned to its normal position.

2. An air controller as specified in claim 1, including a guideway for said cross-head extending in the direction of the length of the rod and supported by said framework, and in which said rod is provided with engaging means intermediate its ends for actuating said valve adjusting means.

3. An air controler comprising a framework, and first, second and third expansible air chambers each having walls including a rigid wall portion attached to said framework, a movable wall separating said first and second chambers and biased to a predetermined position, said third expansible chamber being in free communication with said second chamber and having a movable wall biased to a predetermined position, means providing restricted communication between said second and third chambers and the atmosphere, means regulating the air pressure in the said first chamber comprising a nozzle having a bleed orifice and connected through a restriction to a source of air under pressure and a valve adjustable relative to said nozzle to variably throttle said orifice and thereby vary the pressure in said nozzle, means including an element moving in response to variations in a controlled variable for adjusting said valve to increase or decrease the pressure in said nozzle as said variable varies in one direction or the other from a normal value thereof, and including an element actuated by said third chamber movable wall to effect follow-up and reset adjustments of said valve when the last mentioned wall is moved away from and toward its normal position, a pilot valve mechanism including an input chamber to which the pressure in said nozzle is transmitted and having a movable wall, a bias device subjecting the last mentioned wall to a fixed force opposing the thrust on said wall of the input chamber pressure, and valve means actuated by the movement of the last mentioned wall to increase or decrease the pressure in said output chamber on a movement of said wall away from a normal position in one direction or in the opposite direction, respectively, means for transmitting said output pressure to said first chamber and a regulator actuated by said output pressure to increase or decrease the value of said variable on a variation of said output pressure in one direction or the other.

4. An air controller comprising a framework, first, second, third, fourth and fifth expansible chambers each having walls including a rigid stationary wall portion, a movable partition wall separating said first and second chambers, a separate movable partition wall separating said fourth and fifth chambers, each of said partition walls being biased to a predetermined position, said third expansible chamber being in free communication with said second chamber and having a movable wall biased to a predetermined position, means providing restricted communication between said second and third chambers and the atmosphere, means providing free communication between said first and fifth chambers, means providing restricted communication between said first and fourth chambers, valve means regulating the air pressure maintained in said fourth chamber and valve operating means including one element moving in response to variations in a controlled variable to increase and decrease the pressure in the fourth chamber as said variable varies in one direction or the other from a normal value thereof, and including a second element actuated by a movable wall to effect follow-up and reset adjustments of said valve as said wall is moved away from and returned to its normal position.

5. An air controller comprising first, second, third, fourth and fifth expansible chambers each having walls including a rigid stationary wall portion, a movable partition wall separating said first and second chambers, a separate movable partition wall separating said fourth and fifth chambers, each of said partition walls being biased to a predetermined position, said third expansible chamber being in free communication with said second chamber and having a movable wall biased to a predetermined position, means providing restricted communication between the atmosphere and said second and third chambers, means providing free communication between said first and fifth chambers, means providing restricted communication between said first and fourth chambers, valve means regulating the air pressure maintained in said fourth chamber, valve operating means including an element moving in response to variations in a controlled variable to increase and decrease the pressure in the fourth chamber as said variable varies in one direction or the other from a normal value thereof and including a second element actuated by said movable rod to effect follow-up and reset adjustments of said valve as said movable wall is moved away from and returned to its normal position, and stops limiting the movement of the partition wall separating said fourth and fifth chambers away from a normal position in either direction to an amount less than would be produced by the maximum output pressure if said stops were omitted.

6. An air controller comprising first, second, third, fourth and fifth expansible chambers each having walls including a rigid stationary wall portion, a movable partition wall separating said first and second chambers, a separate movable partition wall separating said fourth and fifth chambers, each of said partition walls being biased to a predetermined position, said third expansible chamber being in free communication with said second chamber and having a movable wall biased to a predetermined position, means including an adjustable flow restricting device providing restricted communication between the atmosphere and said second and third chambers, means providing free communication between said first and fifth chambers, means including an adjustable flow restricting device providing restricted communication between said first and fourth chambers, valve means regulating the air pressure maintained in said fourth chamber, valve operating means including an element moving in response to variations in a controlled variable to increase and decrease the pressure in the fourth chamber as said variable varies in one direction or the other from a normal value thereof, and a second element actuated by said movable wall to effect follow-up and reset adjustments of said valve as said movable wall is moved away from and returned to its normal position.

7. An air controller as specified in claim 6, in which the two flow restricting devices are mechanically coupled for simultaneous adjustment.

8. An air controller as specified in claim 6, including means optionally operable to simultaneously adjust both of said flow restricting devices, or to adjust one only of the two flow restricting devices.

9. An air controller as specified in claim 6, including means optionally operable to simultaneously adjust both of said flow restricting devices, or to adjust the flow restricting device regulating communication between the atmosphere and said second and third chambers without regulating communication between said first and fourth chambers.

10. An air controller as specified in claim 6 in which said flow restricting devices are parallel needle valves arranged in side by side valve chambers formed in a common valve body, and in which side by side rotatable valve adjusting spindles are mounted in said body and provided externally of the latter with gears and in which an adjusting gear is mounted on said body for adjustment between one position in which it operatively engages both of the first mentioned gears and a second position in which it operatively engages one only of said gears.

11. An air controller providing follow-up, reset and rate responses and including means for adjusting the rate time and the reset rate of the controller, comprising a hollow valve body formed with walls including side by side valve chambers, a longitudinally adjustable needle valve mounted in each of said chambers, a separate adjusting spindle for each needle valve rotatably mounted in and extending away from said valve body and in alignment with the corresponding needle valve and operable to longitudinally adjust the latter when rotated, gears carried by the external ends of said spindles and located at different distances from said valve body, an operating member mounted on said valve body to rotate about an axis parallel to said valve spindles and provided with a gear axially movable between a position in which it operatively engages one only of the first mentioned gears and a second position in which it engages both of the first mentioned gears.

DONALD P. ECKMAN.

REFERENCES CITED

The following references are of record in the file of this patent:

UNITED STATES PATENTS

| Number | Name | Date |
| --- | --- | --- |
| 894,411 | Vincent | July 28, 1908 |
| 956,695 | Fetty | May 3, 1910 |